(12) United States Patent
Akiwumi-Assani

(10) Patent No.: US 10,753,620 B2
(45) Date of Patent: Aug. 25, 2020

(54) BURNER ASSEMBLY SHIELDING DEVICE

(71) Applicant: Samuel Akiwumi-Assani, Beacon, NY (US)

(72) Inventor: Samuel Akiwumi-Assani, Beacon, NY (US)

( * ) Notice: Subject to any disclaimer, the term of this patent is extended or adjusted under 35 U.S.C. 154(b) by 134 days.

(21) Appl. No.: 16/123,852

(22) Filed: Sep. 6, 2018

(65) Prior Publication Data
US 2019/0086100 A1 Mar. 21, 2019

Related U.S. Application Data

(60) Provisional application No. 62/558,983, filed on Sep. 15, 2017.

(51) Int. Cl.
*F24C 15/10* (2006.01)
*F24C 15/28* (2006.01)
(Continued)

(52) U.S. Cl.
CPC .............. *F24C 15/28* (2013.01); *A47J 36/36* (2013.01); *A47J 37/0713* (2013.01); *A47J 37/0786* (2013.01)

(58) Field of Classification Search
CPC ........ F24C 15/28; F24C 15/006; F24C 15/02; F24C 15/107; F24C 3/042; F24C 3/14; A47J 36/36; A47J 37/0713; A47J 37/0763; A47J 33/00; A47J 37/0786; A47J 2037/0777; A47J 27/00; A47J 27/004; A47J 36/00; A47J 36/2483; A47J 37/0647; A47J 37/07; A47J 37/0727; A47J 37/0754; A47J 37/0772; A47J 37/079; A47J 37/108; F28D 20/028; F28D 21/0017; H05B 41/14; H05B 45/10; H05B 45/37; H05B 47/105; H05B 47/11; H05B 47/185; H05B 47/19; H05B 6/645; H05B 2206/02; H05B 2206/044; H05B 3/0033; H05B 6/062; H05B 6/129; H05B 6/6408; H05B 6/642; H05B 6/6476; H05B 6/6491; H05B 6/6497; H05B 6/68; H05B 6/687; H05B 6/707; H05B 6/12;
(Continued)

(56) References Cited

U.S. PATENT DOCUMENTS 3,713,432 A 1/1973 Finley
5,535,733 A * 7/1996 Hait .................... A47J 37/0704
126/25 R
(Continued)

FOREIGN PATENT DOCUMENTS

DE 202016003176 U1 * 6/2016 .......... A47J 37/0713
GB 312820 A * 6/1929 .............. F24C 15/28

OTHER PUBLICATIONS

Dolker English translation.*

*Primary Examiner* — Jason Lau

(57) ABSTRACT

A burner assembly shielding device for preventing blowout of a flame generated by the burner assembly includes a tube that is sized and shaped complementarily to a perimeter of a well of a burner assembly. A lower end of the tube is configured to insert into the well so that an upper end of the tube is fixedly positioned proximate to an upper plane that is defined by an upper limit of a grate of the burner assembly. A wall of the tube is configured to shield a flame that is generated by the burner assembly from wind to prevent the flame from being extinguished.

5 Claims, 5 Drawing Sheets

(51) Int. Cl.
*A47J 37/07* (2006.01)
*A47J 36/36* (2006.01)

(58) Field of Classification Search
CPC .......... F23D 11/02; F23D 11/24; F23D 11/36;
F23D 11/38; F23D 11/40; F23D 11/404;
F23D 14/06; F23D 14/12; F23D 14/145;
F23D 14/70; F23D 14/84; F23D 1/00;
F23D 2201/20; F23D 2202/00; F23D
2205/00; F23D 23/00; F23D 91/02; F23K
2203/008; F23K 2203/201; F23K 3/02;
F23K 5/005; F23K 5/007
See application file for complete search history.

(56) References Cited

U.S. PATENT DOCUMENTS

| | | |
|---|---|---|
| 5,979,428 A | 11/1999 | Greene, Jr. |
| 6,973,927 B1 | 12/2005 | Stewart |
| D615,354 S | 5/2010 | Garpelin |
| 7,708,006 B2 | 5/2010 | Sun |
| 8,544,459 B2 | 10/2013 | Rees, Jr. |
| 2005/0115556 A1 | 6/2005 | Carson |

* cited by examiner

BURNER ASSEMBLY SHIELDING DEVICE

CROSS-REFERENCE TO RELATED APPLICATIONS

I hereby claim the benefit under 35 U.S.C. Section 119(e) of U.S. Provisional application 62/558,983 filed on Sep. 15, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to shielding devices and more particularly pertains to a new shielding device for preventing blowout of a flame generated by the burner assembly.

BRIEF SUMMARY OF THE INVENTION

An embodiment of the disclosure meets the needs presented above by generally comprising a tube that is sized and shaped complementarily to a perimeter of a well of a burner assembly. A lower end of the tube is configured to insert into the well so that an upper end of the tube is fixedly positioned proximate to an upper plane that is defined by an upper limit of a grate of the burner assembly. A wall of the tube is configured to shield a flame that is generated by the burner assembly from wind to prevent the flame from being extinguished.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
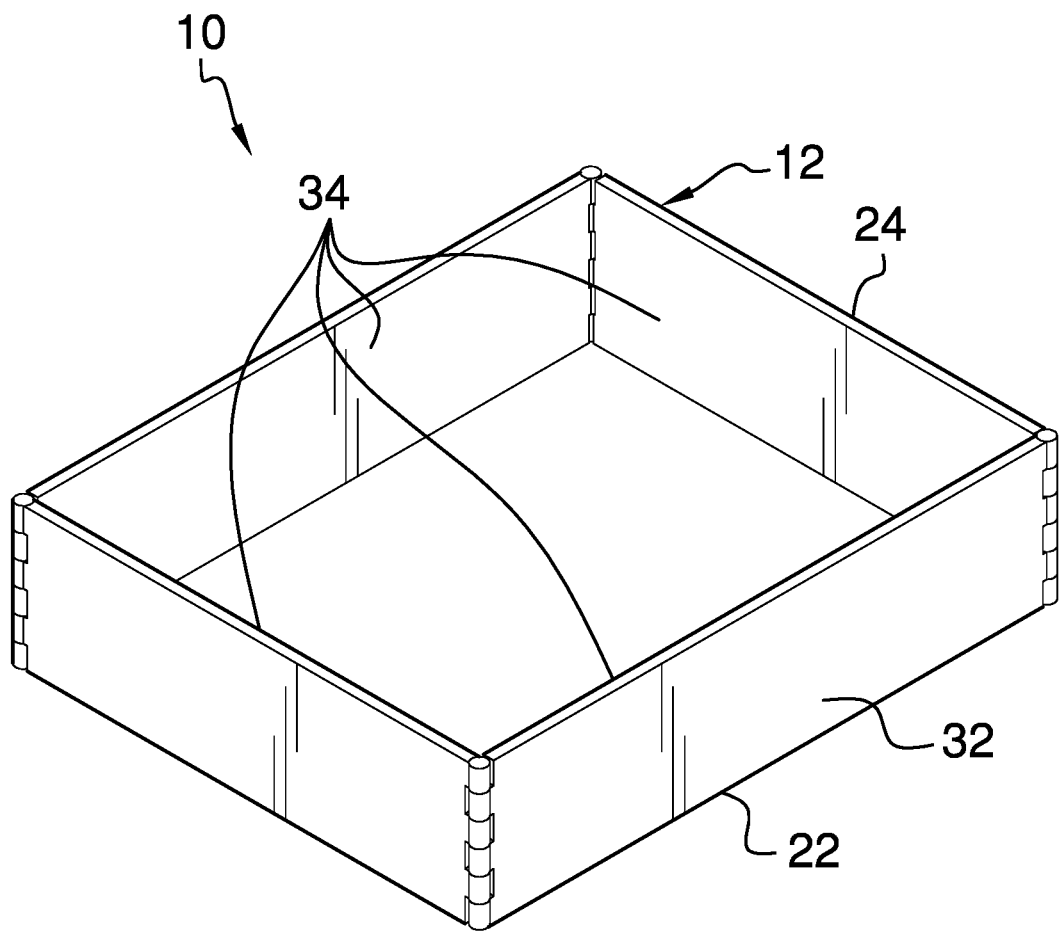
FIG. 1 is an isometric perspective view of a burner assembly shielding device according to an embodiment of the disclosure.
Figure 2:
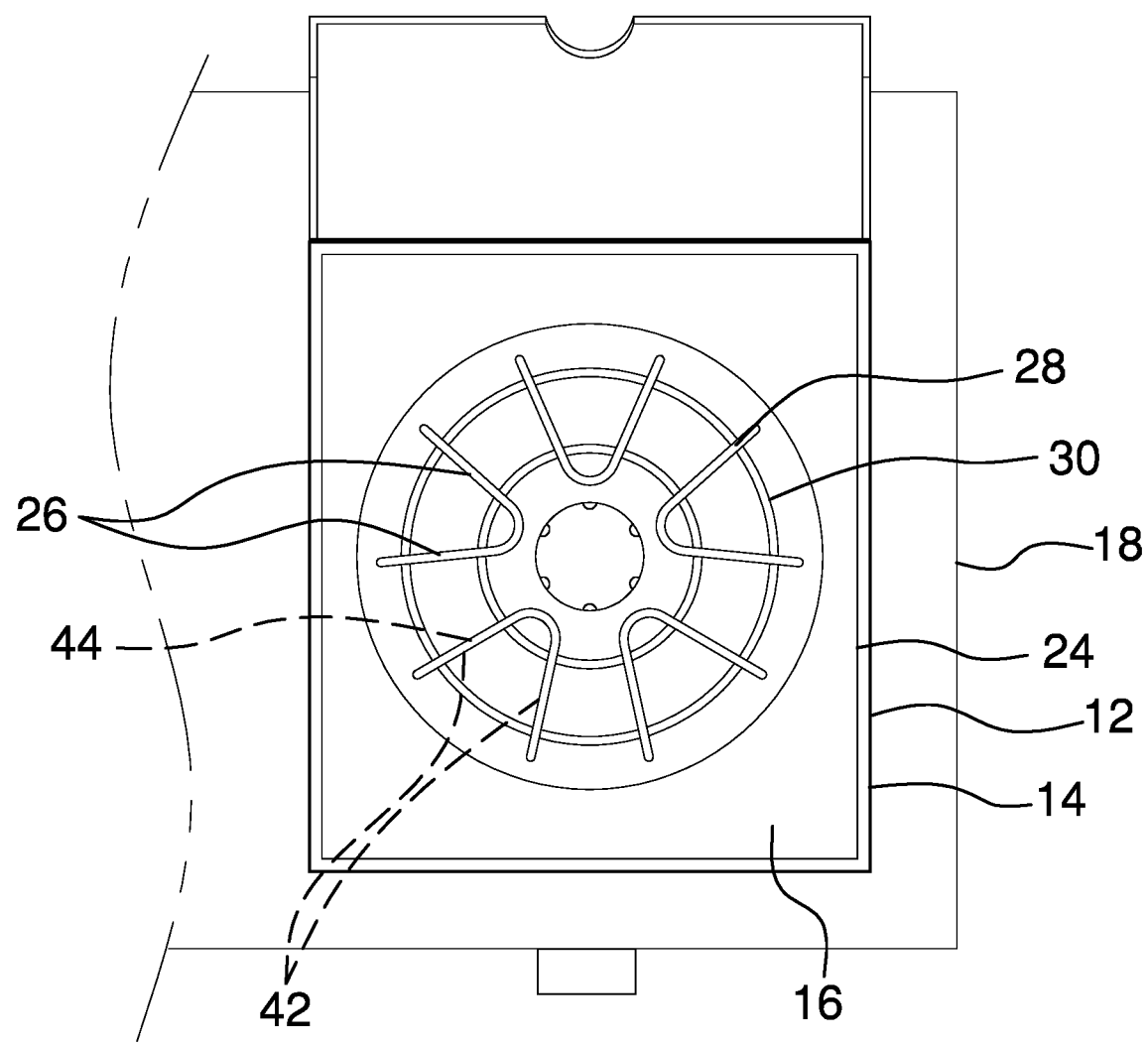
FIG. 2 is a top view of an embodiment of the disclosure.
Figure 3:
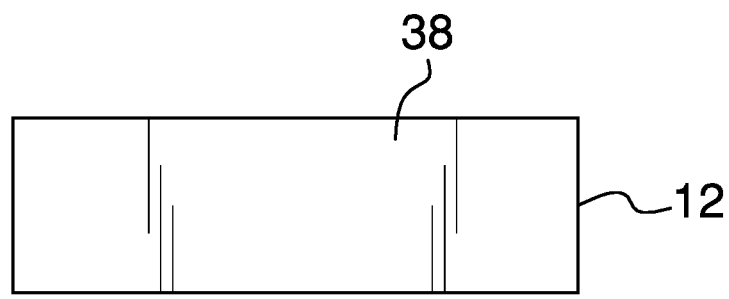
FIG. 3 is a front view of an embodiment of the disclosure.
Figure 4:
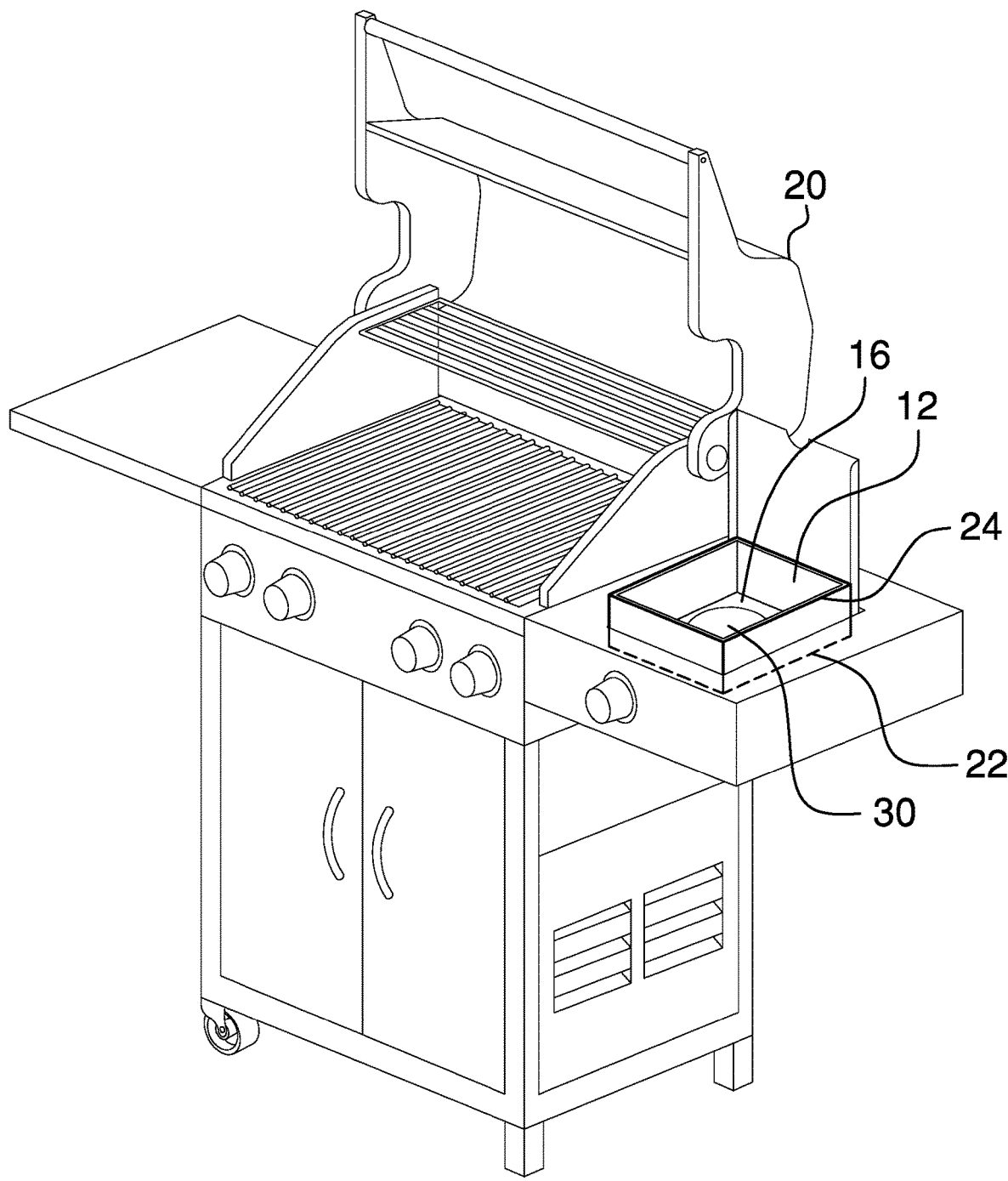
FIG. 4 is an in-use view of an embodiment of the disclosure.

With reference now to the drawings, and in particular to FIGS. 1 through 6 thereof, a new shielding device embodying the principles and concepts of an embodiment of the disclosure and generally designated by the reference numeral 10 will be described.

As best illustrated in FIGS. 1 through 6, the burner assembly shielding device 10 generally comprises a tube 12 that is sized and shaped complementarily to a perimeter 14 of well 16 of a burner assembly 18. The burner assembly 18 may be coupled to a grill 20. A lower end 22 of the tube 12 is configured to insert into the well 16 so that an upper end 24 of the tube 12 is fixedly positioned proximate to an upper plane 26 that is defined by an upper limit 28 of a grate 30 of the burner assembly 18. A wall 32 of the tube 12 is configured to shield a flame that is generated by the burner assembly 18 from wind to prevent the flame from being extinguished. The wall 32 also functions to protect a user from the flame.

The upper end 24 and the lower end 22 are rectangularly shaped. The tube 12 comprises at least one of metal and plastic so that the tube 12 is heat-resistant. The tube 12 comprises steel, stainless steel, or the like.

In one embodiment, as shown in FIG. 1, the upper end 24 and the lower end 22 are squarely shaped to define four sides 34 of the tube 12. In this embodiment, each side 34 is hingedly coupled to adjacent sides 34 so that the tube 12 is selectively collapsible.

Figure 5:
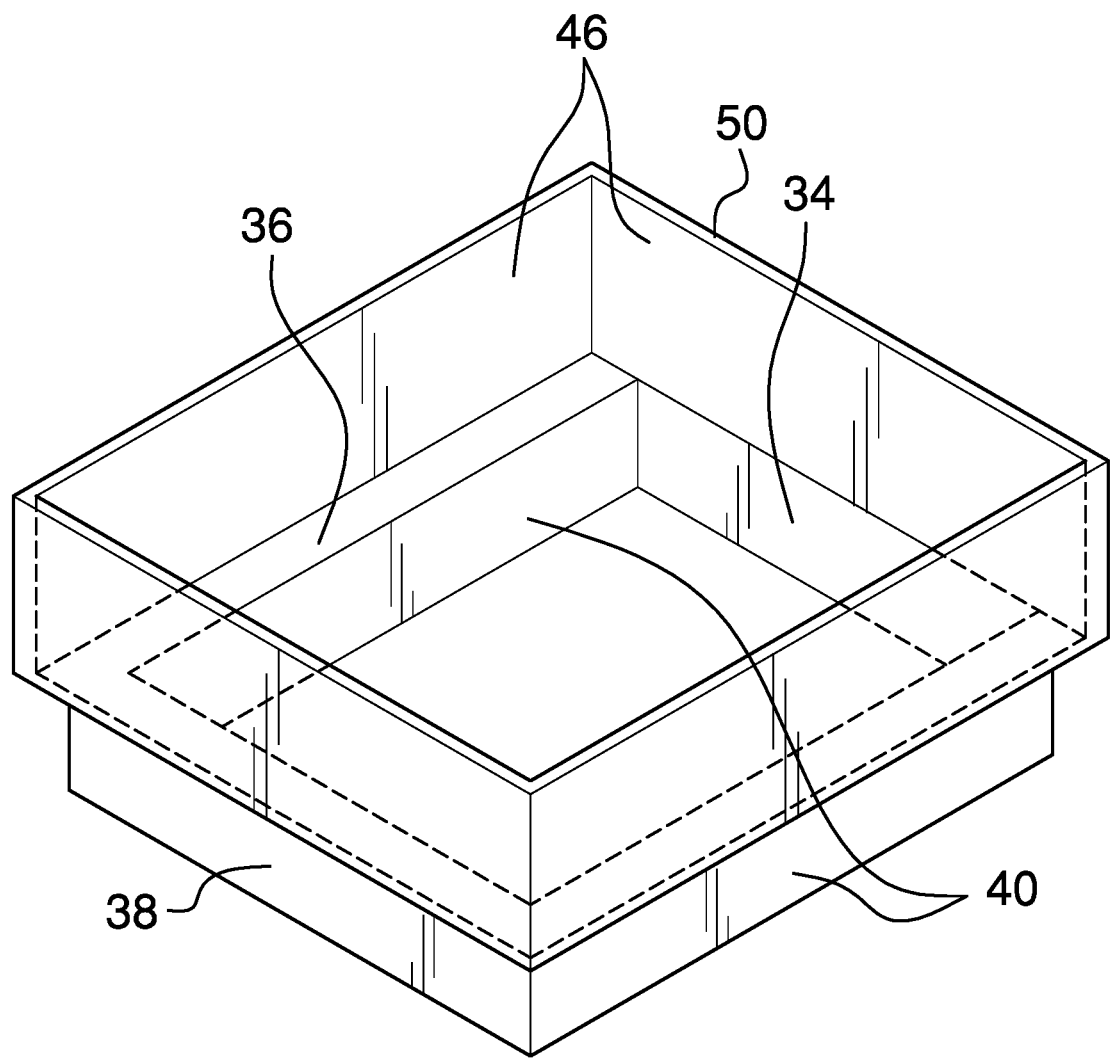
FIG. 5 is an isometric perspective view of an embodiment of the disclosure.
Figure 6:
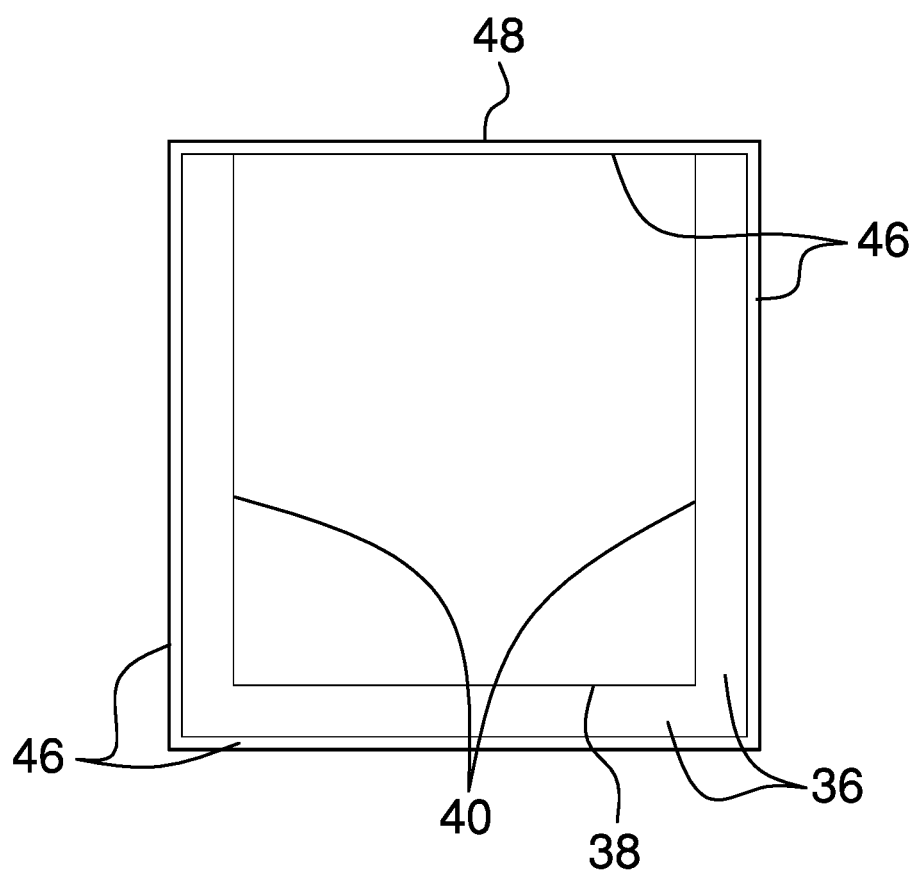
FIG. 6 is a top view of an embodiment of the disclosure.

In another embodiment, as shown in FIGS. 5 and 6, a flange 36 is coupled to and extends substantially perpendicularly from a front 38 and opposing sides 40 of the tube 12 so that the flange 36 is external to the tube 12. The tube 12 of this embodiment is sized so that, when the lower end 22 of the tube 12 is positioned in the well 16, the upper end 24 of the tube 12 is positioned proximate to a lower plane 42 that is defined by a lower limit 44 of the grate 30. In this embodiment, a plate 46 is coupled to and extends substantially perpendicularly from the flange 36 distal from the tube 12. The plate 46 is coupled to and extends substantially perpendicularly from a back 48 of the tube 12 so that the plate 46 is annular. A top 50 of the plate 46 is positioned proximate to the upper plane 26 that is defined by the upper limit 28 of a grate 30 of the burner assembly 18. This embodiment is intended for use with larger pots and pans and allows the heat from the flame to reach the entire lower surface of a larger pot or pan.

The flange 36 and the plate 46 comprise at least one of metal and plastic so that the flange 36 and the plate 46 are heat-resistant. The flange 36 and the plate 46 comprise steel, stainless steel, or the like.

In use, the lower end 22 of the tube 12 is inserted into the well 16 of the burner assembly 18 so that the upper end 24 of the tube 12 is fixedly positioned proximate to the upper plane 26 that is defined by the upper limit 28 of the grate 30. The wall 32 of the tube 12 is configured to shield the flame that is generated by the burner assembly 18 from the wind to prevent the flame from being extinguished.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A burner assembly shielding device comprising:
   a tube sized and shaped complementarily to a perimeter of well of a burner assembly wherein a lower end of the tube is configured for inserting into the well, the tube being sized such that when the lower end of the tube is positioned in the well the upper end of the tube is positioned proximate to a lower plane defined by a lower limit of the grate;
   a flange coupled to and extending substantially perpendicularly from only a front and opposing sides of the tube such that the flange is external to the tube; and
   a plate coupled to and extending substantially perpendicularly from the flange distal from the tube, the plate being coupled to and extending coplanar with a back of the tube such the plate is annular and such that a top of the plate is positioned proximate to an upper plane defined by an upper limit of the grate of the burner assembly.

2. The device of claim 1, further including the flange and the plate comprising at least one of metal and plastic such that the flange and the plate are heat-resistant.

3. The device of claim 1, further including the flange and the plate comprising steel.

4. The device of claim 1, further including the flange and the plate comprising stainless steel.

5. A burner assembly shielding device comprising:
   a tube sized and shaped complementarily to a perimeter of a well of a burner assembly wherein a lower end of the tube is configured for inserting into the well, the tube comprising at least one of metal and plastic such that the tube is heat-resistant, the tube comprising steel, the tube comprising stainless steel;
   a flange coupled to and extending substantially perpendicularly from only a front and opposing sides of the tube such that the flange is external to the tube, the tube being sized such that when the lower end of the tube is positioned in the well an upper end of the tube is positioned proximate to a lower plane defined by a lower limit of a grate of the burner assembly, the flange comprising at least one of metal and plastic such that the flange is heat-resistant, the flange comprising steel, the flange comprising stainless steel; and
   a plate coupled to and extending substantially perpendicularly from the flange distal from the tube, the plate being coupled to and extending substantially coplanar with a back of the tube such that the plate is annular and such that a top of the plate is positioned proximate to an upper plane defined by an upper limit of the grate of the burner assembly, the plate comprising at least one of metal and plastic such that the plate is heat-resistant, the plate comprising steel, the plate comprising stainless steel.

* * * * *